United States Patent [19]
Clark

[11] 3,716,143
[45] Feb. 13, 1973

[54] REVERSE OSMOSIS SEPARATION APPARATUS

[75] Inventor: George B. Clark, Waukesha, Wis.

[73] Assignee: Aqua-Chem, Inc., Milwaukee, Wis.

[22] Filed: March 30, 1970

[21] Appl. No.: 23,687

[52] U.S. Cl. .................................... 210/321, 210/433
[51] Int. Cl. ........................................... B01d 31/00
[58] Field of Search .......... 210/22, 23, 321, 440, 491, 210/433, 130, 258

[56] References Cited

UNITED STATES PATENTS

| | | | |
|---|---|---|---|
| 3,505,216 | 4/1970 | Kryzer | 210/321 X |
| 3,442,389 | 5/1969 | Mendelson | 210/321 |
| 3,462,362 | 8/1969 | Kollsman | 210/23 |
| 3,630,378 | 12/1971 | Bauman | 210/321 X |

*Primary Examiner*—Frank A. Spear, Jr.
*Attorney*—Fred Wiviott and Ralph G. Hohenfeldt

[57] ABSTRACT

A reverse osmosis liquid purification unit particularly adapted for home use in conjunction with low pressure water systems. The unit is adapted to receive water from a low pressure source to provide pure water that would otherwise be unobtainable for such purposes as drinking and direct all unpurified water to appliances within the home utilizing water without wastage.

13 Claims, 4 Drawing Figures

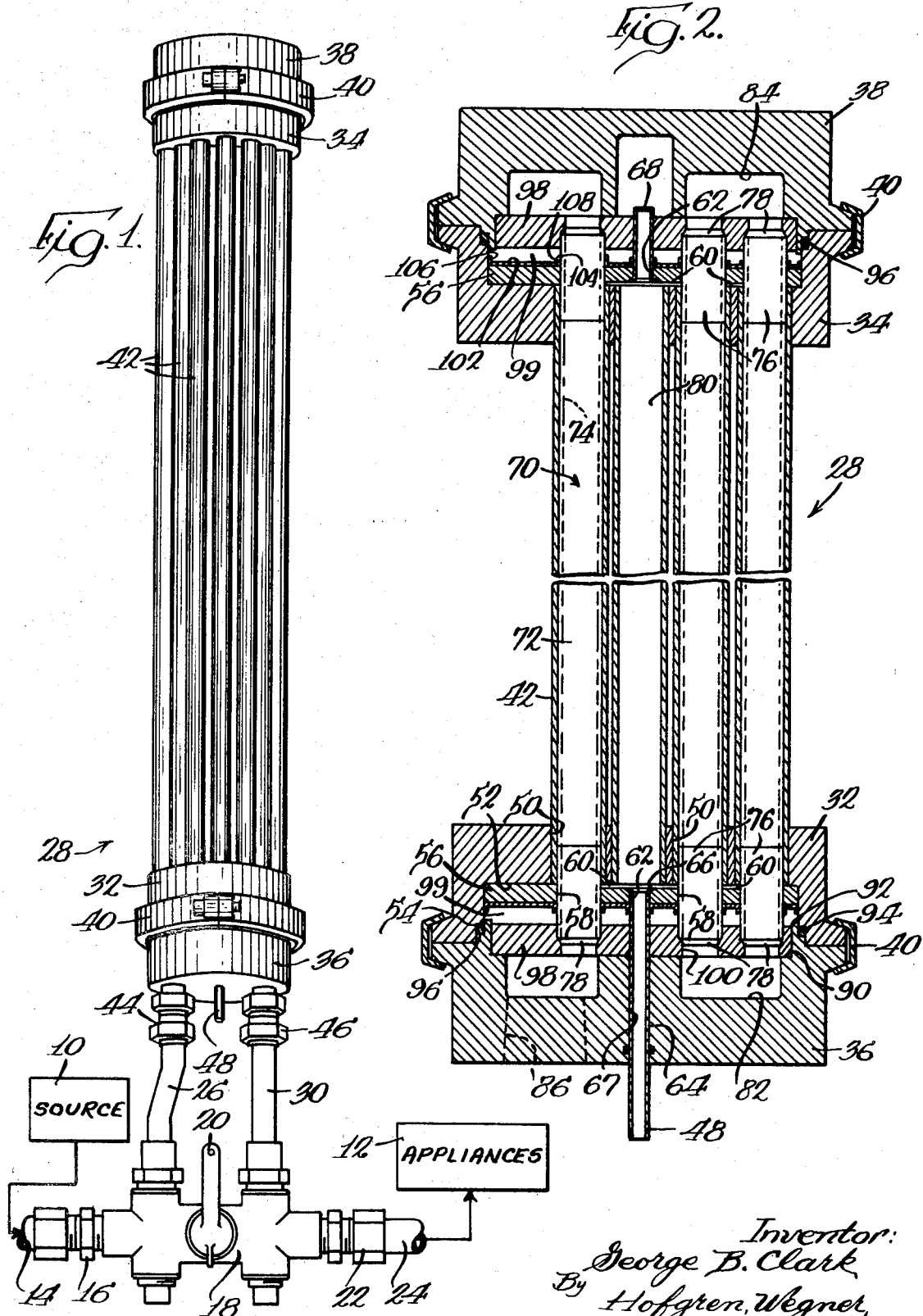

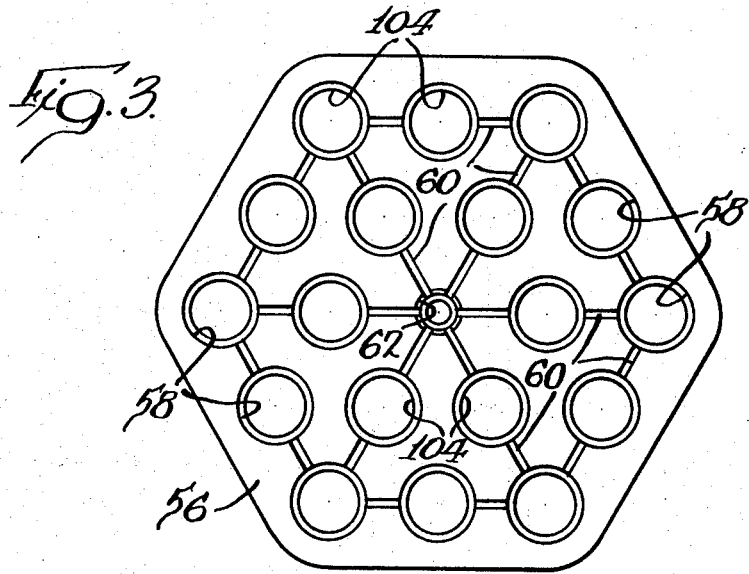
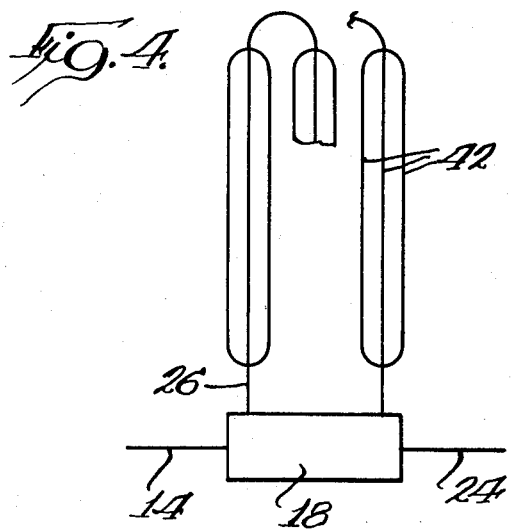

REVERSE OSMOSIS SEPARATION APPARATUS

BACKGROUND OF THE INVENTION

For many years, there has existed a need for relatively inexpensive water purification equipment which may be employed in homes or the like to provide relatively small quantities of pure water for drinking purposes. The need is particularly great where the water supply to the home either by city distribution systems or from a well contains a great deal of minerals. In some cases, standard water softening systems have met the need. However, where minerals not particularly susceptible to removal by standard water softening operations, such as sodium ions, chloride ions, sulfate ions, detergents and poorly ionized organic pollutants are present, the need has not been satisfied. And even standard water softening equipment has significant drawbacks such as the relatively high cost of the equipment, continuing salt requirements, maintenance, etc., with manually regenerated softeners further requiring periodic attention attendant to regeneration.

One phenomenon that may be employed to effect the removal of such minerals is that of reverse osmosis wherein impure water is subjected to a pressure in excess of its osmotic pressure while in contact with a semipermeable membrane. The water that then permeates the membrane is relatively pure and the instant invention makes use of this phenomenon.

Reverse osmosis purification equipment possesses significant advantages over other systems in terms of cost of equipment, low maintenance costs and reliability.

While reverse osmosis water purification systems for home use have been proposed, the same have been designed for essentially continuous water flow across the membrane surface to reduce polarization effects (concentration buildup), at the membrane face which would result in precipitation of solids causing deterioration in membrane performance. Further, that liquid which passes the membrane face and does not permeate the membrane as product water is discharged to waste in order to sustain flow thereby resulting in severe wastage of water.

SUMMARY OF THE INVENTION

It is the principal object of the invention to provide a new and improved water purification device adapted for home use utilizing the principle of reverse osmosis.

More specifically, it is an object to provide such a reverse osmosis unit that can be used in conjunction with intermittently operated water lines and which will not restrict the flow of water to appliances in the home.

The exemplary embodiment of the invention achieves the foregoing objectives with the following construction. The reverse osmosis unit is intended to be placed in series with a source of water under pressure such as a city distribution system or a well pump and the water consuming appliances in the home. The flow path within the unit itself is defined by a plurality of interconnecting membrane cells through which the water may flow from an inlet associated with the water source and an outlet associated with the water consuming appliances. In order to preclude restriction of water flow to the water consuming appliances, certain ones of the plurality of membrane cells are arranged for parallel flow. The groups of membrane cells connected in parallel are in turn connected in series.

Each membrane cell is defined by a tubular, semipermeable membrane received within and supported by a corresponding support tube. According to one embodiment of the invention, the tubular membrane is cast on a porous carrier tube to form an integral membrane unit which is received within a support tube.

Water from the source passing through each membrane cell contacts one side of the membrane therein and that water which permeates the membrane is directed to a pure water outlet which is in fluid communication with the opposite side of the membrane, namely, with the interface between the membrane and its support tube or, if a porous carrier tube is used, with the interface of the porous carrier tube and the support tube.

The plurality of support tubes have their ends received in respective headers. Each header in turn includes an end cap with one of the end caps including a channel therein for connecting the tubes in the desired flow pattern. The other end cap includes similar channel means in addition to the inlet and the outlet. One of the end caps is further provided with a pure water outlet which is in fluid communication with the interface between the tubular membrane and the support tube.

According to one embodiment of the invention, each of the tubular membrane units is provided with a liquid impervious end which extends beyond the end of its respective support tube. There is further provided a grooved surface in fluid communication with the interface of each membrane unit and its respective support tube and the grooved surface is sealed from the end of the membrane by means of a sealing means in the form of a thin, flexible sheet having apertures which receive liquid impervious ends of each membrane tube. Each aperture has the same shape as the liquid impervious end of the associated membrane but is formed with a significantly smaller cross sectional area. The resulting seal permits easy insertion and removal of tubular membranes which have served their usefulness and yet provides a strong seal which tends to provide increasingly better sealing engagement as system pressure is increased.

Other objects and advantages will become apparent from the following specification taken in conjunction with the accompanying drawings.

DESCRIPTION OF THE DRAWINGS

FIG. 1 is a perspective view of a reverse osmosis unit made according to the invention;

FIG. 2 is a condensed cross section of a portion of the reverse osmosis unit;

FIG. 3 is a plan view of a baffle employed in the unit; and

FIG. 4 is a schematic of the flow path employed in the unit.

DESCRIPTION OF THE PREFERRED EMBODIMENT

As best seen in FIG. 1, an exemplary embodiment of the invention is intended for use in a water system including a source 10 of water under pressure. The source 10 may be a city water distribution system or an ordinary well and pump combination. In any event, it is desirable that the source 10 provide low mineral content water to the system at a pressure generally within the range of 30–70 psig. Also included in the system is a plurality of water utilizing appliances 12. As used herein, the term appliances means any device to which water is supplied for a useful purpose. For example, the appliances 12 may take on the form of kitchen sinks, toilets, drinking fountains, humidifying systems, bathtubs, etc.

A pipe 14 serves as an inlet conduit from the source 10 and is connected by means of appropriate fittings, generally designated 16, to a conventional bypass valve 18 having a manual operator 20. Bypass valve 18 also includes a connection via fittings 22 and a pipe 24 to the appliances 12. In addition, the bypass valve 18 is connected to a conduit 16 through which water from the source 10 may be directed to a purification unit, generally designated 28, and is connected to a conduit 30 from which water may be received from the unit 28 to be directed through the conduit 24 to the appliances 12. As is well known, the operator 20 of the bypass valve 18 may be selectively operated to either direct water from the source 10 through the unit 28 and then to the appliances 12, or, directly from the source 10 to the appliances 12.

The purification unit 28 includes a pair of spaced headers 32 and 34 having associated end caps 36 and 38 respectively. Each of the headers 32 and 34 has its respective end cap 36 and 38 secured thereto by any suitable clamping means. According to one embodiment, conventional ring clamps 40 may be employed. Extending between the headers 32 and 34 are a plurality of membrane support tubes 42.

As seen in FIG. 1, the inlet conduit 26 is connected by means of fittings 44 to an inlet in the end cap 36 while the conduit 30 is connected to an outlet in the end cap 36 by means of fittings 46. The end cap 36 is also provided with a small pure water outlet 48 which may be connected by means of a flexible hose or the like to any suitable pure water collection means or utilization system.

Turning now to FIG. 2, the purification unit may be seen in greater detail. The headers 32 and 34 are generally similar and accordingly, only one need be described in detail. Specifically referring to the header 32, the same includes a plurality of circular apertures 50 which receive the ends of the support tubes 42. According to one embodiment of the invention, the support tubes 42 may be arranged in the desired configuration and the end caps 32 and 34 cast about the ends of them utilizing a suitable plastic. According to another embodiment of the invention, the end caps 32 and 34 may be preformed and have the tubes mounted in the apertures 50 and secured thereto by means of a suitable resin. The end cap 32 includes a recess 52 having a stepped outer lip 54.

Received within the recess 52 is a baffle 56 which, as seen in FIGS. 2 and 3, includes apertures 58 which are aligned with the apertures 50 in the end cap. The baffle 56 also includes a plurality of baffle grooves 60 in the innermost face thereof which interconnect each of the apertures 56 to a central collection point defined by a chamferred aperture 62 in the center of the baffle 56. Returning to FIG. 2, the chamferred aperture 62 receives a conduit 64 having a flared end 66 for retention purposes and which extends through a bore 67 in the end cap 36. The conduit 64 serves as the pure water outlet 48.

The baffle 56 associated with the header 34 is similarly formed with baffle grooves 60 and the chamferred aperture 62. However, in lieu of the conduit 64, a dead ended cap 68 is provided.

WIthin each of the support tubes 42 is a membrane unit, generally designated 70, which consists essentially of an outer paper tube 72 having a tubular semipermeable membrane 74 bonded to the interior thereof. The ends of each unit 70 are provided with plastic ferrules 76 having tapered ends 78. Preferably, either the outer surface of the paper tube 72 or the inner surface of the support tube 42 or both, is provided with a plurality of thin, longitudinally extending grooves to enhance the flow of purified water permeating the membrane 74 and paper tube 72 to the baffle grooves 60.

The foregoing construction of the membrane unit 70 and its cooperation with grooves either in the paper tube 72 or in the support tube 42 or both, is set forth in greater detail in the commonly assigned application of Clark, bearing Ser. No. 788,871, filed Jan. 3, 1969, and entitled "Reverse Osmosis Liquid Purification", now Pat. No. 3,518,900, issued June 1, 1971.

Since, as will be seen, purified water accumulates in the header 34 which is remote from the outlet 48, provision is made to conduct such purified water to the same. Specifically, the centermost one of the support tubes 42, designated 80, is not provided with a membrane unit. Furthermore, the same is arranged in fluid communication with the baffle grooves 60 in the baffle 56 associated with the header 34.

As a result of the foregoing construction, pure water permeating the membrane film 74 of each membrane cell will be conducted along the interface of each membrane unit 70 and its corresponding support tube 42 through the paper tube 72 and/or the longitudinally extending grooves mentioned previously to the baffle grooves 60 in both of the baffles 56. In the case of the baffle 56 associated with the header 32, purified water will be directed by the baffle grooves 60 directly to the outlet 48. In the case of the baffle 56 associated with the header 34, the baffle grooves 60 will direct the purified water to the center tube 80 of the unit 28 through which it may flow to the outlet 48.

Referring now to the end cap 36, it will be seen that the same is provided with a plurality of redirecting channels 82 in fluid connection with the ends of the membrane units 70. Similarly, the end cap 38 is provided with channels 84.

The end cap 36 is additionally provided with a fluid inlet and a fluid outlet to be connected via the fittings 44 and 46 to the conduits 26 and 30 respectively. In FIG. 2, the inlet is shown as a bore 86 in the end cap 36 while the outlet is not shown.

Each end cap 36 and 38 also includes a relatively shallow recess 90 surrounded by an outwardly projecting ring flange 92 which in turn is surrounded by a stepped relieved portion 94. The outside diameter of the ring flange 92 is equal to the inside diameter of the recess 52 of the corresponding header while the outside diameter of the stepped portion 94 is the same diameter as the inside diameter of the stepped flanged 54 of the associated end cap. As a result, the ring flange 92 serves as a guide means to properly locate the end caps 36 and 38 with respect to their corresponding headers 32 and 34 while the provision of the stepped portions 54 and 94 define a small recess which may receive an O-ring 96 to seal the end caps to their respective headers.

In order to effectively minimize cross flow between the channels 82, a gross seal in the form of a flexible gasket 98 is located in the recess 90 of each end cap and defines, with the associated baffle 56, a high pressure area 99. The gasket 98 includes a plurality of apertures 100 having a diameter less than the outside diameter of the plastic ferrules 76 and are arranged on the gasket 98 to be concentric with the support tubes 42. Thus, as seen in FIG. 2, each ferrule extends partly into the gasket to provide a seal.

Finally, to seal the inlet water stream from the outlet water stream, there is provided a seal 102 bonded to the back side of each baffle 56 within the high pressure area 99. The seal 102 is formed of a thin sheet of rubber and includes a plurality of apertures 104 (FIG. 3) through which the ferrules 76 extend before engaging the gasket 98. The apertures 104 have a smaller diameter than the outside diameter of each ferrule and each sheet forming the seal 102 has a greater diameter than the inside diameter of the recess 52 of the associated end cap.

Each seal 102 is located against the side of the baffle 56 opposite the groove 60 and because of the relative dimensions set forth previously, the outer periphery of the same tends to form an upturned lip 106 against the side of the recess 52 in the associated header 34 while the edges of the apertures 104 form upturned lips 108 about the associated plastic ferrule 76. The inherent resiliency of the material forming each seal 102 insures sealing engagement between the baffle 56, the ferrule 76 and the associated header. Furthermore, because of the direction of the upturned lips 106 and 108 and their location on the high pressure side of the system, it will be appreciated that increased system pressure will tend to push the upturned portions 106 and 108 increasingly harder against the end cap and the ferrule, respectively. Accordingly, there is provided a seal whose effectiveness increases as pressure increases.

The usefulness of the seals 102 is not limited to low pressure reverse osmosis operating conditions but may be employed with advantage in reverse osmosis apparatus operating at extremely high pressures such as 1,000 psig.

Furthermore, each seal 102 need not be formed separately from the baffle 56 but may be cast integrally thereon. When the reverse osmosis apparatus operates at relatively low pressure, the entire baffle 56 in seal 102 may be formed as a single unit out of soft rubber. However, if the apparatus will operate at high pressures, total formation of soft rubber of a combined baffle 56 and seal 102 may not be desirable due to the high pressure applied to the backside of the baffle having a tendency to collapse the grooves therein. Therefore, the grooved side of the baffle is preferably formed of a hard rubber while the seal portion 102 of such construction would be formed of a soft rubber.

Additionally, the seal 102, whether fabricated separately from the baffle 56 or integrally therewith, need not be formed of rubber. There are varieties of suitable plastics having the requisite flexibility so as to render their use satisfactory. However, practice has shown that a rubber material is somewhat desirable in that tolerances in forming and locating the apertures in the seal 102 need not be as exacting as would be the case if plastics were used.

Referring now to FIG. 4, an exemplary flow pattern is illustrated. According to one embodiment of the invention, 19 of the tubes 42 are provided with the centermost tube being utilized as the return conduit 80 for the purified water and the remaining 18 tubes serving as support tubes for membrane structures 70. The 18 tubes are grouped into six groups of three each and the channels 82 and 84 are constructed so that each group of three tubes is in series with the remaining groups of tubes while the tubes in each group are in parallel with each other. Obviously, other arrangements can be used. However, it is desirable that at least some of the tubes be connected in parallel so as not to restrict the flow of water through the unit to the appliances 12.

In operation, water at line pressure, generally on the order of 30-70 psig is fed into the unit and, for most water supplies of the type with which the invention is concerned, such a pressure will be in excess of the osmotic pressure of the inlet water. Accordingly, reverse osmosis will take place with pure water being directed through the outlet 48 whether or not the appliances 12 are being used at that time, because of the presence of pressurized water within the unit reverse osmosis will continue to take place. When the appliances 12 are used, there will be flow through the unit to the appliances 12, which flow will not be restricted due to the use of the parallel arrangement of the membrane cells mentioned previously. Furthermore, the flow of water through the unit to appliances requiring a relatively large quantity of water, such as a toilet or a bathtub occurs will have the effect of flushing the surfaces of the membranes to preclude buildup of unwanted material which would otherwise effect the purification rate of the membrane.

It will therefore be appreciated that the invention provides a low cost, low maintenance means for providing relatively pure water for such purposes as may be desired in a way that all water directed to the unit and not purified thereby may be utilized without wastage.

I claim:

1. In a water purifying system, the combination comprising:
   inlet means adapted to be connected to a source of pressurized feedwater and outlet means adapted to be connected to feedwater utilizing appliance means,
   tubular reverse osmosis water purifying means constructed and arranged to allow substantial flushing flow inside the tubes and interposed between said inlet and outlet means and connected serially between a feedwater source and appliance means, a pure water outlet, said purifying means comprising semipermeable membrane means having one side thereof in fluid communication with said inlet means and another side in fluid communication with said pure water outlet, said appliance feeding outlet being in fluid communication with said one side of said membrane for receiving all water from said feedwater inlet not permeating said membrane and feeding the same to appliance means, the pressure applied to said inlet being substantially the same as the pressure of the feedwater source and the flow of feedwater through said inlet being relatively small when said appliance outlet is not conducting water and relatively high to flush said purifying means of concentrated impurities when said appliance outlet is conducting water.

2. The system of claim 1 further including a selectively operable bypass valve interconnecting said inlet and said appliance feeding outlet.

3. The system of claim 1 wherein said membrane means comprises a plurality of membrane cells, at least some of said cells being connected in parallel flow relation so as not to restrict the flow of water to said appliance means.

4. A reverse osmosis water purification unit adapted for use with changing flow low pressure low mineral content water systems to provide pure water without wastage of water comprising:
a plurality of membrane cells, at least some of which are connected together for parallel flow of water therethrough and each including a semipermeable membrane having a first side to be subjected to impure water and a second side from which pure water may be received, said membrane cells defining a closed flow path;
inlet means adapted to be connected with an impure water distribution system and being in fluid communication with said one sides of said membrane for receiving and directing all impure input water directly from the water distribution system to said first side of said membranes and being located at one end of said flow path;
impure water outlet means in fluid communication with said first side of said membranes and located at the other end of said flow path, said outlet means being constructed and arranged to direct all water from said inlet and passing through said flow path to a point of use, whereby to provide high velocity flow in series with a system to flush concentrated impurities from said membrane cells;
a pure water outlet in fluid communication with said second side of said membranes;
each of said membrane cells being tubular and comprising an inner tubular semipermeable membrane and an outer support tube;
first header means supporting one end of each of the plurality of tubes;
second header means supporting the other end of each of the plurality of tubes;
first end cap means associated with one of said header means for connecting certain of the tubes for parallel flow and other for serial flow;
and second end cap means associated with the other of said header means including said impure water inlet means and said impure water outlet means;
one of said end cap means further including said pure water outlet and means in fluid communication with the interface of each tube and the corresponding membrane and said pure water outlet.

5. A reverse osmosis unit according to claim 4 wherein each tubular membrane includes a liquid impervious end located beyond an end of the respective support tube and said means in fluid communication with the interface of each tube and the corresponding membrane includes a grooved surface; and sealing means in sealing engagement with said liquid impervious ends to seal the same from said grooved surface.

6. A reverse osmosis unit according to claim 5 wherein said sealing means comprises a sheet of deformable material having a plurality of apertures adapted to receive the liquid impervious ends of said tubular membranes, the cross sectional area of said apertures being significantly less than the cross sectional area of said liquid impervious ends.

7. In a system for separating the solvent in a liquid mixture from the mixture by reverse osmosis, the combination comprising:
a support tube for a semipermeable membrane,
a tubular membrane within said support tube,
one of said membrane and said support tube being provided with a liquid impervious end,
a mounting arranged so that said liquid impervious end projects from the same,
liquid mixture directing means for directing a liquid mixture under high pressure to the interior of said tubular membrane,
said directing means and said mounting defining a high pressure area, and
sealing means comprising a thin flexible, generally normally planar sheet-like means having an aperture similar in shape to the shape of said liquid impervious end but of significantly smaller size disposed about said liquid impervious end and having one side backed by said mounting and another side facing said high pressure area and having an outturned lip embracing said liquid impervious end within said high pressure area and formed by distortion of the aperture surrounding a portion of the sealing means when the same is applied to the liquid impervious end to thereby provide a seal that responds positively to increasing pressure in said high pressure area.

8. Reverse osmosis apparatus according to claim 7 wherein said liquid impervious means is on the end of the tubular membrane.

9. A reverse osmosis apparatus according to claim 7 wherein said mounting comprises a baffle having a groove in fluid communication with the interface of said support tube and said tubular membrane.

10. In a system for separating the solvent in a liquid mixture from the mixture by reverse osmosis, the combination comprising: a support tube for a semipermeable membrane, a tubular membrane within said support tube and having a liquid impervious end extending therefrom, a baffle having an aperture receiving said liquid impervious end, said baffle having a fluid conduit on one side thereof in fluid communication with the interface of said support tube and said tubular membrane and a normally planar lip on the other side thereof surrounding said aperture, said lip projecting into said aperture and being adapted to be distorted by the liquid impervious end of the membrane when the same is placed in the aperture to tightly embrace the same; and means defining a high pressure area adjacent said other side of said baffle including means for introducing a liquid mixture under high pressure into said liquid impervious end.

11. In a reverse osmosis apparatus according to claim 10 wherein said lip is integral with said baffle.

12. In a reverse osmosis apparatus according to claim 10 wherein said lip is bonded to said baffle.

13. In an apparatus for separating the solvent from a liquid mixture by reverse osmosis, the combination comprising: the plurality of elongated, tubular membrane structures, each having a liquid impervious end, mounting means mounting the ends of said membrane structures, said liquid impervious ends projecting outwardly from said mounting means: means defining a high pressure area adjacent said liquid impervious ends including means for directing the liquid mixture to be processed under high pressure into said liquid impervious ends; and sealing means including an element having a plurality of apertures for receipt of the liquid impervious ends of the respective membrane structures, said apertures being of generally similar shape but substantially smaller size than said liquid impervious ends, the portions of said element adjacent said apertures being thin and flexible and adapted to be distorted by the liquid impervious ends into said high pressure area and tightly embrace said liquid impervious ends.

* * * * *